US012752909B2

(12) United States Patent
Mizumoto et al.

(10) Patent No.: US 12,752,909 B2
(45) Date of Patent: Oct. 6, 2026

(54) BLADE, FLYING OBJECT, AND MANUFACTURING METHOD THEREOF

(71) Applicant: Mitsui Chemicals, Inc., Tokyo (JP)

(72) Inventors: Kazuya Mizumoto, Sodegaura (JP); Yoshihiko Kanda, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 18/709,706

(22) PCT Filed: Nov. 4, 2022

(86) PCT No.: PCT/JP2022/041126
§ 371 (c)(1),
(2) Date: May 13, 2024

(87) PCT Pub. No.: WO2023/085198
PCT Pub. Date: May 19, 2023

(65) Prior Publication Data
US 2025/0002137 A1 Jan. 2, 2025

(30) Foreign Application Priority Data
Nov. 15, 2021 (JP) ................................ 2021-185621

(51) Int. Cl.
*B64C 11/26* (2006.01)
*B29D 99/00* (2010.01)

(52) U.S. Cl.
CPC .......... *B64C 11/26* (2013.01); *B29D 99/0025* (2013.01)

(58) Field of Classification Search
CPC ......... B64C 11/26; B64C 11/18; B64C 11/20; B64C 11/22; B64C 11/24; B64C 27/46; B64C 27/473; B64C 27/4733; B64C 27/4736; B64C 27/615; B64C 39/02; B64C 39/024; B64U 10/10; B64U 10/14; B29D 99/0025; B29D 99/0028
See application file for complete search history.

(56) References Cited

U.S. PATENT DOCUMENTS

| | | | | |
|---|---|---|---|---|
| 5,527,155 | A | 6/1996 | Chen et al. | |
| 6,182,929 | B1 * | 2/2001 | Martin .................... | B63B 39/06 244/99.11 |
| 2011/0168324 | A1 | 7/2011 | Ender | |
| 2013/0343898 | A1 * | 12/2013 | Folsom .................. | B64C 11/24 29/889.71 |

FOREIGN PATENT DOCUMENTS

| | | | | | |
|---|---|---|---|---|---|
| EP | 2921402 | A1 * | 9/2015 | ............. | B29C 44/14 |
| JP | 2011517635 | A * | 6/2011 | ............. | B29C 70/48 |
| JP | 2012071805 | A * | 4/2012 | | |
| JP | 5228518 | B2 * | 7/2013 | ........... | B29C 33/005 |

(Continued)

*Primary Examiner* — Ryan C Clark
(74) *Attorney, Agent, or Firm* — BUCHANAN INGERSOLL & ROONEY PC

(57) ABSTRACT

A blade is provided in which the specific rigidity of a flap part is further increased. This blade has a thick body part and a thin flap part integrally formed in the rear end of the body part. The flap part has a skin material containing a fiber-reinforced thermoplastic resin, and a core material containing a thermoplastic resin foam filled inside the skin material.

7 Claims, 5 Drawing Sheets

(56) References Cited

FOREIGN PATENT DOCUMENTS

| | | | | | |
|---|---|---|---|---|---|
| JP | 2017177704 | A | * | 10/2017 | |
| KR | 20180067765 | A | * | 6/2018 | |
| KR | 102131562 | B1 | * | 7/2020 | |
| WO | WO-2009000227 | A2 | * | 12/2008 | ........... B64C 27/473 |
| WO | WO-2013110895 | A1 | * | 8/2013 | .............. B23P 15/04 |
| WO | WO-2016090405 | A1 | * | 6/2016 | |

* cited by examiner

BLADE, FLYING OBJECT, AND MANUFACTURING METHOD THEREOF

TECHNICAL FIELD

The present invention relates to a blade, a flying object, and a method for producing the blade.

BACKGROUND ART

Blades that rotate and move in air or other fluids are used for wings and propellers in flying objects such as airplanes, helicopters, and drones, screws in ships, and rotors (rotating bodies) such as windmill blades.

A blade having a structure such that its front end in the moving direction is thick and a thin blade trailing edge is disposed at its rear end is preferred because such a blade can reduces resistance when moving the blade, making it easier to obtain lift, and the like.

There is a demand for blades to have stiffness that can withstand resistance during movement. At the same time, there is also a demand for blades to be more lightweight for purposes such as reducing fuel consumption. As a means to meet these demands, a configuration in which the surface of a core material made of resin foam is covered with a fiber-reinforced resin material is known (for example, Patent Literature (hereinafter, referred to as PTL) 1). In the blade described in PTL 1, the blade trailing edge is formed only from a fiber-reinforced resin material, and such a configuration is considered to be effective from the viewpoint of increasing the stiffness of the blade trailing edge, which is thin and susceptible to breakage.

CITATION LIST

Patent Literature

PTL 1
Japanese Patent Application Laid-Open No. 2017-177704

SUMMARY OF INVENTION

Technical Problem

The blade having the configuration described in PTL 1 is also considered to have the stiffness by virtue of the fiber-reinforced resin material and also the lightness by virtue of the resin foam. However, from the findings of the present inventors, the blade described in PTL 1 does not have satisfactory stiffness per weight of the blade trailing edge (hereinafter also referred to as "specific stiffness."

The present invention has been made in view of the problems of the prior art described above, and an object of the present invention is to provide a blade having higher specific stiffness in the blade trailing edge thereof, and a method for producing the blade.

Solution to Problem

A blade according to an embodiment of the present invention for achieving the above object is a blade including a main body portion that is thick and a blade trailing edge that is thin and integrally formed with a rear end of the main body portion. In the blade, the blade trailing edge includes a skin material and a core material, the skin material containing a thermoplastic resin that is fiber-reinforced, the core material containing a foam of a thermoplastic resin filling an inside of the skin material.

A method for producing a blade according to another embodiment of the present invention for achieving the above object is a method for producing a blade, the blade including a main body portion that is thick and a blade trailing edge that is thin and integrally formed with a rear end of the main body portion. The method includes: preparing a thermoplastic resin foam and a fiber-reinforced thermoplastic resin configured to hold the thermoplastic resin foam from the top and bottom of the thermoplastic resin foam; and forming the blade including the blade trailing edge by hot-pressing the thermoplastic resin foam and the fiber-reinforced thermoplastic resin, in which the blade trailing edge of the formed blade includes a skin material and a core material, the skin material containing the fiber-reinforced thermoplastic resin, the core material containing the thermoplastic resin foam filling an inside of the skin material.

Advantageous Effects of Invention

The present invention is capable of providing a blade having higher specific stiffness in the blade trailing edge thereof, and a method for producing the blade.

DESCRIPTION OF EMBODIMENTS

Drone and Blade thereof

Figure 1:
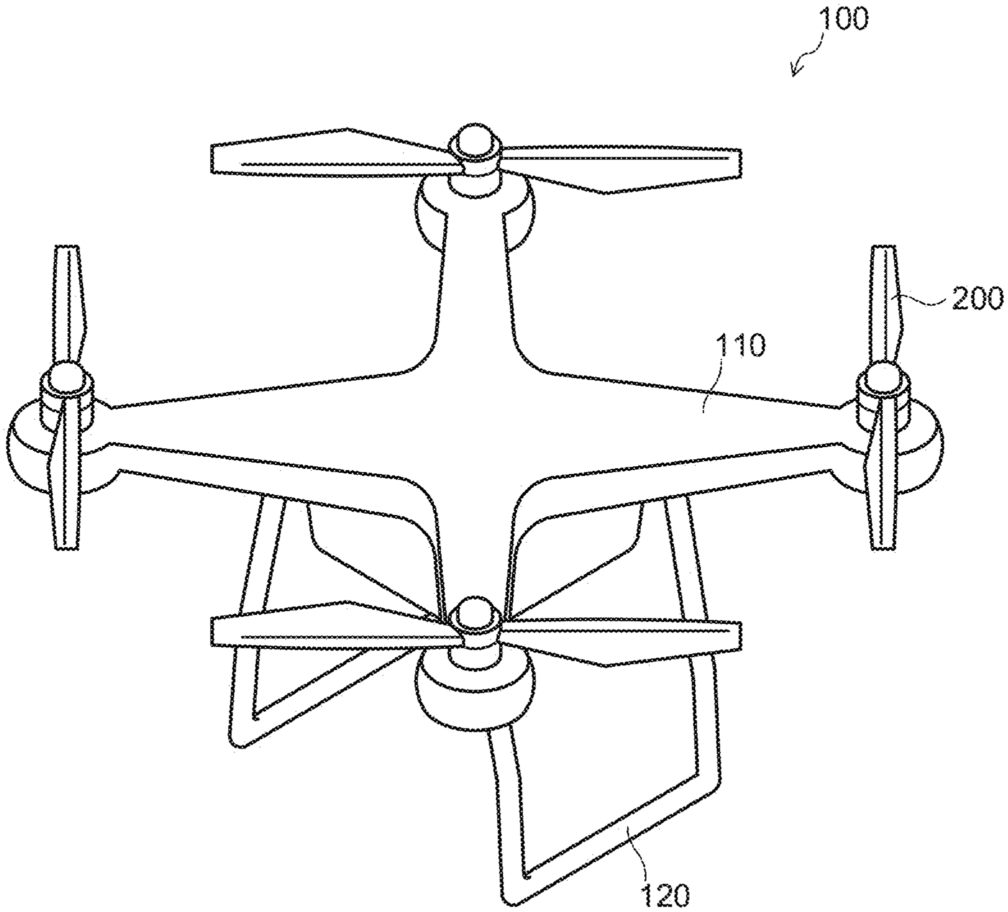
FIG. 1 is a schematic perspective view of a drone according to an embodiment of the present invention.

FIG. 1 is a schematic perspective view of drone 100 according to an embodiment of the present invention. As illustrated in FIG. 1, drone 100 includes body portion 110, a plurality of blades 200, and leg portion 120. Drone 100 can fly by rotating each blade 200 and can move while flying. In the present embodiment, drone 100 includes four blades 200, all of which have the same shape.

Blade

Figure 2A:
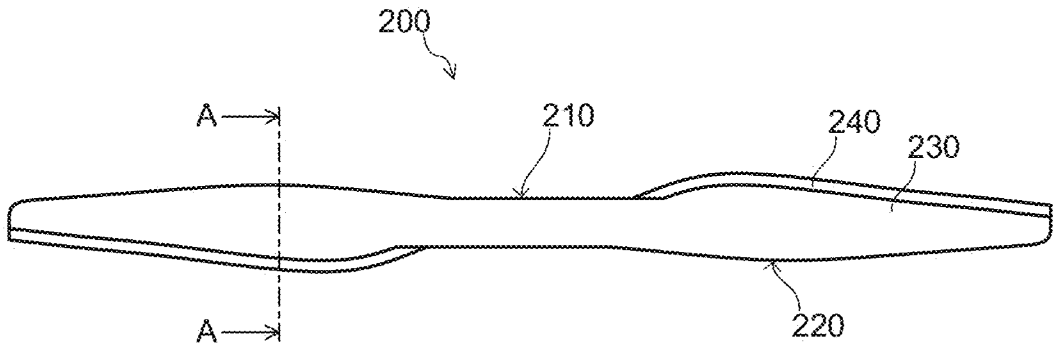
FIG. 2A is a plan view illustrating one of the blades in the drone illustrated in FIG. 1.
Figure 2B:
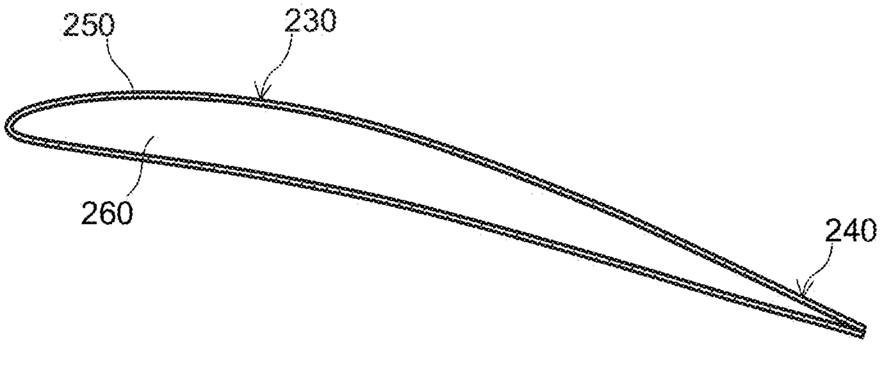
FIG. 2B is a cross-sectional view of the blade taken along line A-A in FIG. 2A.

FIG. 2A is a plan view illustrating one of blades 200 in drone 100, and FIG. 2B is a cross-sectional view of blade 200 taken along line A-A in FIG. 2A.

As illustrated in FIG. 2A, blade 200 includes center portion 210 that serves as a rotation axis, and a pair of plate-shaped wing portions 220 extending from the center portion. The pair of (two) wing portions 220 have the same shape and are disposed in opposite directions from center portion 210 in such a way that the angle between the wing portions is 180 degrees.

In addition, as illustrated in FIGS. 2A and 2B, blade 200 includes thick main body portion 230 disposed at the front in the rotational direction and thin blade trailing edge 240 disposed at the rear in the rotational direction. Hereinafter, the rotational direction is also referred to as the "moving direction" because each wing portion 220 moves in the rotational direction. It is preferable that the thickness of blade trailing edge 240 is ½ or less of the thickness of main body portion 230.

Both main body portion 230 and blade trailing edge 240 includes skin material 250 containing a fiber-reinforced thermoplastic resin (i.e., a thermoplastic resin that is fiber-reinforced), and core material 260 containing a foam of a thermoplastic resin (herein also referred to as "thermoplastic resin foam") filling the inside of skin material 250. Main body portion 230 and blade trailing edge 240 are integrally formed. "Integrally formed" means that blade 200 including main body portion 230 and blade trailing edge 240 is formed in a single forming process. Being integrally formed can be confirmed by the fact that there is no joining part (seam) between main body portion 230 and blade trailing edge 240.

The thickness of main body portion 230 is preferably 1 mm or more and 20 mm or less, more preferably 1.5 mm or more and 15 mm or less, and even more preferably 2 mm or more and 10 mm or less. In addition, the maximum width (maximum width in the moving direction of blade 200) of main body portion 230 is preferably 1/20 or more and ½ or less, more preferably 1/10 or more and ⅓ or less, and even more preferably 1/7 or more and ¼ or less of the length of wing portion 220. The length of wing portion 220 in a flying object including a plurality of blades (such as drone 100 of the present embodiment) may be determined by the maximum takeoff weight (the sum of the aircraft weight and the carried weight) and the number of blades used. For example, when the takeoff weight is 25 kg and the number of blades is 16 (8 rotors with 2 blades per rotor), the length of wing portion 220 is preferably 20 mm or more and 40 mm or less. For blade 200 that rotates as in the present embodiment, the length of wing portion 220 is a value obtained by dividing the length of a line segment connecting both ends of the blade in the length direction by two.

The thickness of blade trailing edge 240 is preferably 0.3 mm or more and 10.0 mm or less, more preferably 0.4 mm or more and 7 mm or less, and even more preferably 0.5 mm or more and 5 mm or less. In addition, the maximum width (maximum width in the moving direction of blade 200) of blade trailing edge 240 is preferably 1/10 or more and 2 or less, more preferably 1/7 or more and 1.5 or less, and even more preferably ¼ or more and 1 or less of the maximum width of the main body portion.

As illustrated in FIGS. 2A and 2B, the thicknesses and widths of main body portion 230 and blade trailing edge 240 may vary depending on location. Herein, the thickness of blade trailing edge 240 may be measured at a position 2 mm from the rear end of the blade trailing edge on an imaginary line-in the front-rear direction of movement and passing through a part where wing portion 220 has the maximum thickness; and the thickness of main body portion 230 may be measured at a position of the thickest part of wing portion 220. In addition, the maximum width of main body portion 230 is the length of a part having a thickness exceeding ½ of the maximum thickness of wing portion 220 on the imaginary line-in the front-rear direction of rotation and passing through the maximum width part; and the width of the blade trailing edge 240 is the length obtained by subtracting the maximum width of the main body portion from the maximum width of wing portion 220.

For forming core material 260 by extruding a melted and kneaded resin composition into a mold as in PTL 1, it is usually difficult to insert the resin composition into the thin blade trailing edge as described above. In contrast, as described below, blade 200 (in which core material 260 satisfactorily enters into the inside of blade trailing edge 240) can be formed by preparing a sandwich-shaped material, in which fiber-reinforced thermoplastic resins (which serve as the material of skin material 250) hold a thermoplastic resin foam therebetween from the top and bottom of the thermoplastic resin foam, and hot-pressing the sandwich-shaped material from above and below. In order to achieve satisfactory shapeability by hot-pressing, a thermoplastic resin is used as the resin for both skin material 250 and core material 260.

In general, lightness and stiffness are contradictory physical properties; thus, as lightness improves, stiffness tends to decrease, and as stiffness improves, lightness tends to decrease. For example, when the blade trailing edge is formed only from a fiber-reinforced resin material as described in PTL 1, the stiffness of blade trailing edge increases, but the weight of the blade trailing edge also increases due to the relatively heavy reinforcing fiber, thus the specific stiffness does not satisfactorily increase. As described above, conventional inventions have not focused on achieving both lightness and stiffness of blade trailing edge 240.

In contrast, in the present embodiment, core material 260 including a thermoplastic resin foam is also disposed inside blade trailing edge 240. This configuration allows blade trailing edge 240 to be lightweight by virtue of core material 260, which is foam, and to have stiffness by virtue of skin material 250, which is a fiber-reinforced resin. Therefore, blade trailing edge 240 can be both lightweight and rigid.

In blade trailing edge 240, the ratio of the thickness of skin material 250 to the thickness of core material 260 may be set in view of the above-described specific stiffness. For example, the ratio of the thickness of skin material 250 to the thickness of core material 260 (skin material/core material) is preferably 1/25 or more and 2/1 or less, more preferably 1/20 or more and 1/1 or less, even more preferably 1/10 or more and ½ or less. Regarding the above ratio, the thickness of skin material 250 is the total thickness of the two skin materials 250, which hold core material 260 therebetween from the top and bottom of the core material. In addition, the thicknesses of skin material 250 and core material 260 for calculating the above ratio are values obtained by measuring the thickness and width at the measurement positions of blade trailing edge 240 described above.

The thickness of skin material 250 in blade trailing edge 240 is preferably 0.05 mm or more and 3 mm or less, more preferably 0.1 mm or more and 2 mm or less, and even more preferably 0.3 mm or more and 1 mm or less. The thickness of skin material 250 in main body portion 230 is not limited, but may be equal to the thickness of skin material 250 in blade trailing edge 240.

Skin Material

Skin material 250 includes a fiber-reinforced thermoplastic resin. The type of reinforcing fibers in the fiber-reinforced thermoplastic resin is not limited, and examples of thereof for use include carbon fibers, glass fibers, aramid fibers, alumina fibers, silicon carbide fibers, boron fibers, and metal fibers. In particular, carbon fibers and aramid fibers are preferred because of the low density thereof, and from the viewpoint of, in particular, reducing the weight of blade trailing edge 240 and further increasing its specific stiffness. In addition, from the viewpoint of further increasing the specific stiffness of blade trailing edge 240, carbon fibers are more preferred.

The reinforcing fibers may be randomly oriented or unidirectionally oriented long fibers with a length of 15 mm or more, randomly oriented or unidirectionally oriented short fibers with a length of less than 15 mm, or a combination thereof. From the viewpoint of further improving the specific stiffness of blade trailing edge 240, skin material 50 preferably includes reinforcing fibers oriented in one direction. The following configuration is possible: long fibers are oriented in only one direction; a plurality of layers having orientation directions of long fibers different to each other may be formed in skin material 250; or the long fibers may be woven into skin material 250. Alternatively, blocks each include long fibers oriented in one direction may be disposed in skin material 250 in such a way that the long fibers in each block are oriented in a random direction. In particular, from the viewpoint of improving shapeability during the production, it is preferable that a plurality of layers in which long fibers are oriented in the same or different directions are formed in skin material 250, or that long fibers are woven into skin material 250.

In addition, the average diameter of the reinforcing fibers is preferably 1 μm or more and 20 μm or less, more preferably 4 μm or more and 10 μm or less, from the viewpoint of satisfactorily increasing the effect of improving stiffness.

Unmodified polyolefin is preferably an ethylene polymer with a content of the constituent unit derived from ethylene of 50 mol % or more, or a propylene polymer with a content of the constituent unit derived from propylene of 50 mol % or more. Examples of the ethylene polymer include ethylene homopolymers and copolymers of ethylene and an α-olefin having 3 or more and 10 or less carbon atoms. Examples of the propylene polymer include propylene homopolymers and copolymers of propylene and an α-olefin having 4 or more and 10 or less carbon atoms. The unmodified polyolefin is preferably a propylene homopolymer, an ethylene homopolymer, an ethylene/propylene copolymer, a propylene/1-butene copolymer, or an ethylene/propylene/1-butene copolymer.

The content of the reinforcing fibers based on the total mass of skin material 250 is preferably 20 mass % or more and 80 mass % or less, more preferably 30 mass % or more and 75 mass % or less, even more preferably 30 mass % or more and 65 mass % or less, and particularly preferably 35 mass % or more and 60 mass % or less.

The content of reinforcing fibers based on the total volume of skin material 250 is preferably 10 volume % or more and 70 volume % or less, more preferably 15 volume % or more and 60 volume % or less, and even more preferably 20 volume % or more and 60 volume % or less.

The material of a matrix resin that holds the reinforcing fibers in skin material 250 is not limited as long as the material is a thermoplastic resin. The matrix resin may be a crystalline resin or an amorphous resin.

Examples of the thermoplastic resin include polyolefin resins such as polyethylene, polypropylene, polybutene, and poly(4-methyl-1-pentene), polyamide resin, polyester resin, polystyrene resin, thermoplastic polyimide resin, polyamideimide resin, polycarbonate resin, polyphenylene ether resin, polyphenylene sulfide resin, polyacetal resin, acrylic resin, polyetherimide resin, polysulfone resin, polyetherketone resin, polyetheretherketone resin, polyarylate resin, polyethernitrile resin, vinyl chloride resin, ABS resin, and fluororesin.

In particular, a polyamide resin and a polyolefin resin are preferred as the resins are less likely to be damaged even when a flying matter such as a pebble collides with the resin, increasing the reliability of blade 200. From the viewpoint of preventing reduction of mechanical properties when skin material 250 absorbs water, a polyolefin resin is more preferred, and a polypropylene resin is even more preferred.

The matrix resin may be a resin composition containing at least one additive. Examples of the additive include known fillers (inorganic fillers and organic fillers), pigments, dyes, weather-resistant stabilizers, heat-resistant stabilizers, antistatic agents, anti-slip agents, antioxidants, anti-mold agents, antibacterial agents, flame retardants, and softeners. For example, when the matrix resin is melted by laser irradiation and adhered to the base to form heat conductive part 116, the matrix resin is preferably a resin composition containing a dye that absorbs the laser having a wavelength used for irradiation. Any dye that absorbs light with a wavelength of 300 nm or more and 3,000 nm or less may be used, and carbon black is preferred.

As described in the below producing method, a thermoplastic resin foam is held between two fiber-reinforced thermoplastic resin sheets (namely upper and lower fiber-reinforced thermoplastic resin sheets), which are then hot-pressed to form blade 200, in the present embodiment. By using different types of thermoplastic resin compositions contained in respective two upper and lower fiber-reinforced thermoplastic resin sheets, the types of matrix resins contained in the upper and lower skin materials 250 may be made to be different from each other. However, the types of matrix resins contained in the upper and lower skin materials 250 are preferably the same.

In addition, the matrix resin may contain at least one additional component such as a resin other than the above-described resin and short fibers having a length shorter than that of the above-described carbon fibers.

The content of the matrix resin based on the total mass of skin material 250 is preferably 20 mass % or more and 80 mass % or less, more preferably 25 mass % or more and 70 mass % or less, even more preferably 35 mass % or more and 70 mass % or less, and particularly preferably 40 mass % or more and 65 mass % or less.

The content of the matrix resin based on the total volume of skin material 250 is preferably 30 volume % or more and 90 volume % or less, more preferably 40 volume % or more and 85 volume % or less, and even more preferably 40 volume % or more and 80 volume % or less.

Core Material

Core material 260 is a thermoplastic resin foam.

The type of thermoplastic resin constituting the thermoplastic resin foam is not limited. Examples of the thermoplastic resin for use include polyolefin resins such as polyethylene, polypropylene, polybutene, and poly(4-methyl-1-pentene), polyamide resin, polyester resin, polystyrene resin, thermoplastic polyimide resin, polyamideimide resin, polycarbonate resin, polyphenylene ether resin, polyphenylene sulfide resin, polyacetal resin, acrylic resin, polyetherimide resin, polysulfone resin, polyetherketone resin, polyetheretherketone resin, polyarylate resin, polyethernitrile resin, vinyl chloride resin, ABS resin, and fluororesin.

The thermoplastic resin serving as the matrix resin of skin material 250 and the thermoplastic resin constituting the foam in core material 260 are preferably the same type of resin. Herein, the same type of resin means that the manner in which the constituent units (repeat units) in the main chains of the resins are bonded to each other is common among the resins. For example, when the matrix resin of skin material 250 is a polyamide resin, the thermoplastic resin constituting the foam in core material 260 is also preferably a polyamide resin, and when the matrix resin of skin material 250 is a polyolefin resin, the thermoplastic resin constituting the foam in core material 260 is also preferably a polyolefin resin. The resins of the same type have a high affinity for each other and are likely to mix together at the interface between skin material 250 and core material 260, and such a mixing can increase the bonding strength between skin material 250 and core material 260. In addition, herein, resins of the same type means that these resins account for 50 mass % or more based on the total mass of the thermoplastic resin constituting the matrix resin and the thermoplastic resin constituting the foam, respectively.

In addition, the thermoplastic resin serving as the matrix resin of skin material 250 and the thermoplastic resin constituting the foam in core material 260 are preferably compatible with each other. This configuration allows these resins to be compatible each other during hot-press molding, thereby further increasing the bonding strength between skin material 250 and core material 260. Being compatible to each other means a combination of thermoplastic resins that can form a single phase when these resins are heated to a temperature above the melting points of all the resins, mixed, and then cooled to 25° C. (when the matrix resins contained in the upper and lower skin materials 250 are different from each other, these thermoplastic resins refer to three types, namely two types of matrix resins and one type of thermoplastic resin constituting the foam).

In addition, the difference between the melting point of the thermoplastic resin serving as the matrix resin of skin material 250 and the melting point of the thermoplastic resin constituting the foam in core material 260 is preferably within 10° C. When the matrix resins contained in the upper and lower skin materials 250 are different from each other, it is sufficient that the difference in melting point between one of the matrix resins and the thermoplastic resin constituting the foam is within 10° C. However, it is preferable that the difference in melting point between both of the matrix resins and the thermoplastic resin constituting the foam is within 10° C. During hot-press molding, it is desirable to heat both (or all) resins to a temperature at which the resins can satisfactorily flow and deform. At this time, when the melting points of the resins are close to each other, the resins would satisfactorily flow, allowing the resins to mix or to be compatible with each other. In addition, such a configuration can prevent the resin having a lower melting point from deteriorating and the foamed shape from collapsing, which may be caused by setting the heating temperature according to the resin having a higher melting point.

The density of the foam is preferably 0.2 g/cc or more and 0.6 g/cc or less, more preferably 0.25 g/cc or more and 0.4 g/cc or less. The cells in the foam may be closed cells or open cells. In particular, closed cells are preferred because of the higher strength thereof.

The expansion ratio of the foam is preferably 1.3 times or more and 5 times or less, more preferably 2 times or more and 4 times or less.

Method for Producing Blade

Figure 3A:
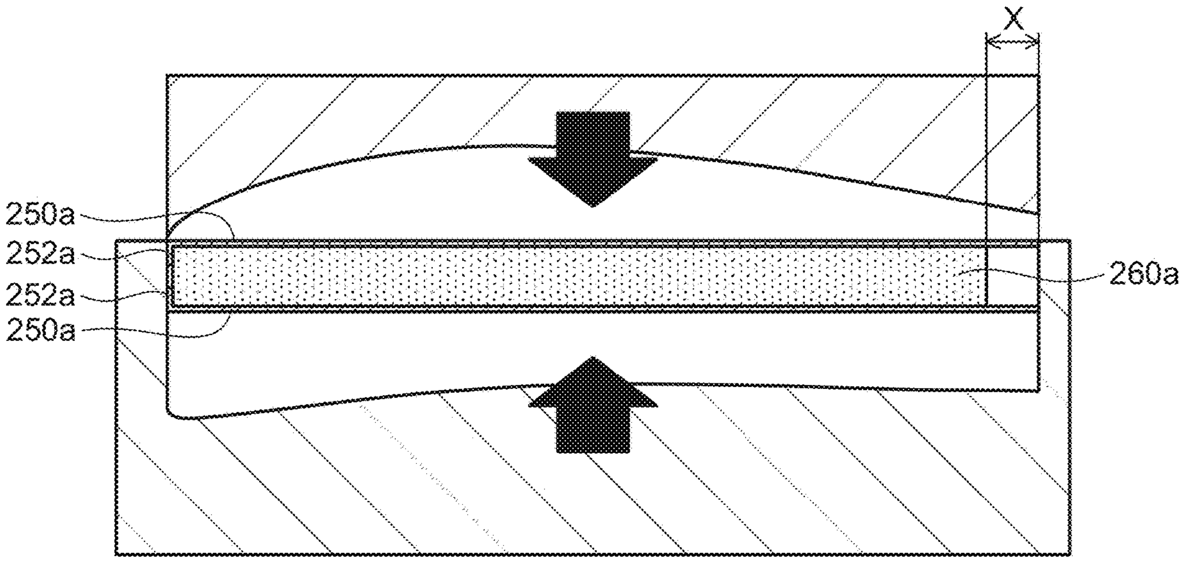
FIGS. 3A and 3B schematically illustrate a method for producing the blade in the drone illustrated in FIG. 1.
Figure 3B:
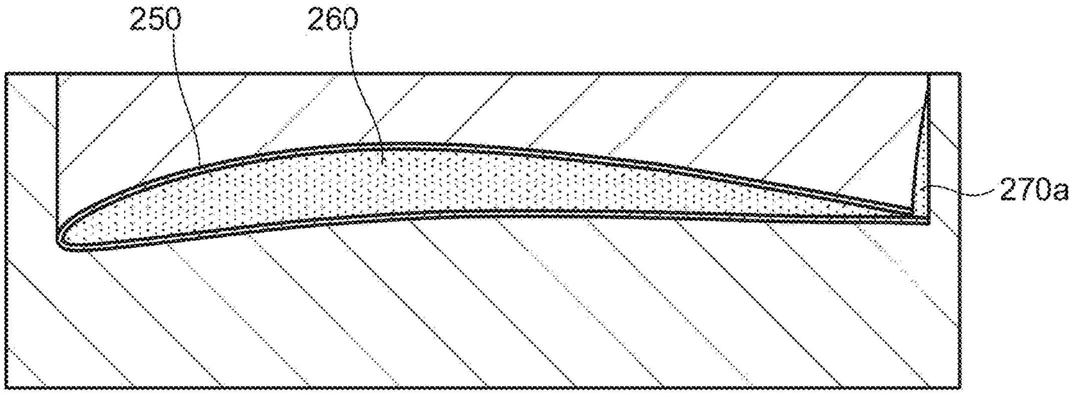

Blade 200 may be produced by the following steps: preparing thermoplastic resin foam 260*a* (hereinafter simply referred to as "foam 260*a*") and two fiber-reinforced thermoplastic resin sheets 250*a* configured to hold foam 260*a* from the top and bottom of foam 260*a* (step 1); and forming the blade by hot-pressing these components (step 2). FIG. 3A is a schematic diagram illustrating step 1, and FIG. 3B is a schematic diagram illustrating step 2.

Step of Preparing (Step 1)

In step 1, the shape of foam 260*a* and sheets 250*a* when viewed in the vertical direction (pressing direction) may be approximately the same or similar to the shape of blade 200 when viewed in the same direction. When it is desired to change the thickness of skin material 250 between main body portion 230 and blade trailing edge 240, sheet 250*a* for main body portion 230 and sheet 250*a* for blade trailing edge 240 may be prepared, respectively. However, from the viewpoint of preventing sheet displacement during hot-pressing, sheet 250*a* having a shape of the combination of main body portion 230 and blade trailing edge 240 is preferably used, thereby having a uniform thickness of skin material 250 between main body portion 230 and blade trailing edge 240.

On the one hand, in the embodiment illustrated in FIGS. 3A and 3B, foam 260*a* is caused to flow inside a mold in a direction from main body portion 230 toward the rear end of blade trailing edge 240 during the hot-pressing, and a part of foam 260*a* is discharged from the rear end of blade trailing edge 240 to the outside of blade 200 (outside sheet 250*a*), as in the description for step 2 below. From the viewpoint of reducing the amount of the part of foam 260*a*, which becomes unnecessary for the formed blade 200 due to this discharge, the following configuration is preferred: the shape of foam 260*a* when viewed in the vertical direction is smaller than the shape of blade 200, in particular, the width of the foam 260*a* in the front-rear direction (width of blade 200 in the moving direction) at a part thereof to become blade trailing edge 240 is smaller than the width ("X" in FIG. 3A) of blade trailing edge 240 to be formed.

In addition, from the viewpoint of preventing the formation of a gap that is not filled with foam 260*a* inside the formed blade 200, the shape and size of foam 260*a* in the parts other than the part to become blade trailing edge 240 (for example, a part to become main body portion 230) are preferably the same as or slightly smaller than the shape and size of the other parts to be formed.

The thickness of foam 260*a* may be set in such a way that the volume of foam 260*a* becomes larger than the volume of the core material of the formed blade 200.

On the other hand, in the embodiment illustrated in FIGS. 3A and 3B, front ends 252*a* of sheets 250*a* are wrapped around the front corners of foam 260*a* on the front side of blade 200 to prevent discharge of foam 260*a* from the front end of the blade, as in the description for step 2 below. Therefore, the shape of sheet 250*a* at the part to become main body portion 230 is preferably such that it extends and becomes larger in front of main body portion 230 by the amount of front end 252*a* to be wrapped around the front corner of foam 260*a*. The wrapped-around front ends 252*a* of the two upper and lower sheets 250*a* come into close contact with each other and are fused together during hot-pressing. Therefore, front ends 252*a* of sheets 250*a* do not need to be in contact with each other in the present step.

In addition, from the viewpoint of preventing deviations in the dimensions of blade 200 and the occurrence of wrinkles in skin material 250 due to a surplus of sheet 250*a*, the shape and size of sheet 250*a* in the parts other than the front of the part to become main body portion 230 (for example, the part to become blade trailing edge 240) are preferably the same as the shape and size of the parts to be formed.

Foam 260*a* may be any thermoplastic resin foam to be used as the material for core material 260 described above. The expansion ratio of the foam is substantially maintained before and after the next step (hot-pressing).

As sheet 250*a*, a sheet-shaped fiber-reinforced resin obtained by impregnating the reinforcing fibers as a material for skin material 250 with the matrix resin as a material for skin material 250 as described above may be used. The sheet-shaped fiber-reinforced resin is preferably a unidirectional material in which reinforcing fibers are oriented in one direction, from the viewpoint of further improving specific stiffness. The orientation and dispersion state of the reinforcing fibers are maintained before and after the next step (hot-pressing).

Sheet 250_a_ may be a single-layer sheet-shaped object, or may be a laminate of a plurality of sheet-shaped objects. The orientation angles of the reinforcing fibers in the respective sheet-shaped objects may be the same or different to each other. In addition, each sheet-shaped object may be a fabric including a plurality of sheet-shaped objects cut into thin strips woven therein. In particular, from the viewpoint of improving shapeability, it is preferable to use a fabric including a plurality of sheet-shaped objects woven therein.

Forming Blade (Step 2)

Next, foam 260_a_ described above and two upper and lower sheets 250_a_ holding the foam therebetween are disposed in a mold (FIG. 3A). At this time, the front ends of sheets 250_a_ are wrapped around the front corner of foam 260_a_.

When hot-pressing is performed in this state, foam 260_a_ softens to flow, upper and lower two sheets 250_a_ are fused together, and skin material 250 made of a fiber-reinforced thermoplastic resin surrounds the foam, thereby obtaining blade 200 including core material 260 made of the thermoplastic resin foam disposed therein.

At this time, in the embodiment illustrated in FIGS. 3A and 3B, the surplus of the thermoplastic resin foam (the form caused to flow by the hot-pressing) is allowed to flow in such a way that the surplus is more likely to be discharged through the rear end of blade trailing edge 240 rather than through the front end of main body portion 230. For example, as illustrated in FIG. 3A, by wrapping sheet 250_a_ around the front corner of foam 260_a_, foam 260_a_ having softened to flow is less likely to be discharged to the outside through the front end. In addition, as illustrated in FIG. 3A, the width of foam 260_a_ in the part to become blade trailing edge 240 is set smaller than the width of blade trailing edge 240 to be formed; thus, foam 260_a_ is more likely to flow to the rear end of blade trailing edge 240 and to be discharged from the rear end of blade trailing edge 240.

Foam 260_a_, having softened to flow, flows between the upper and lower sheets 250_a_ in the thin blade trailing edge 240 to fill blade trailing edge 240 to its rear end, and the surplus of the foam is discharged to the outside from the rear end of blade trailing edge 240. The discharged foam 260_a_ forms a thin needle-shaped burr 270_a_ that protrudes from the tip of blade trailing edge 240 (FIG. 3B). Such a protruding burr 270_a_ can be easily cut off, thus can be easily removed.

As described above, in the embodiment illustrated in FIGS. 3A and 3B, an increased surplus of foam 260_a_ is discharged from the rear end of blade trailing edge 240 during hot-pressing. The surplus of foam 260_a_ can be thus easily formed into a thin needle-shaped burr 270_a_, which can be easily cut off, thereby smoothing the shape of blade 200 and improving the appearance of the blade.

Figure 4A:
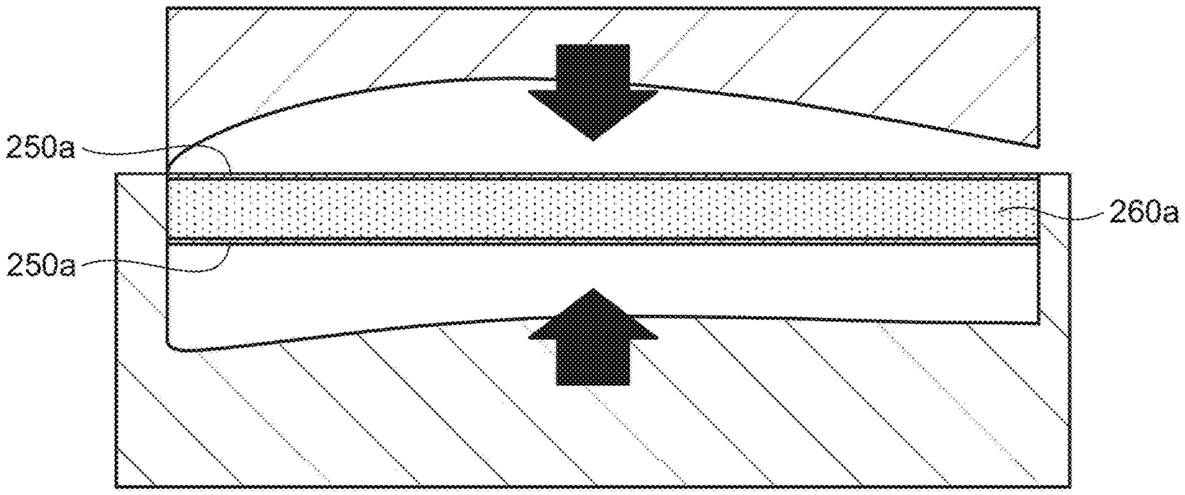
FIGS. 4A and 4B schematically illustrate another method for producing the blade in the drone illustrated in FIG. 1.
Figure 4B:
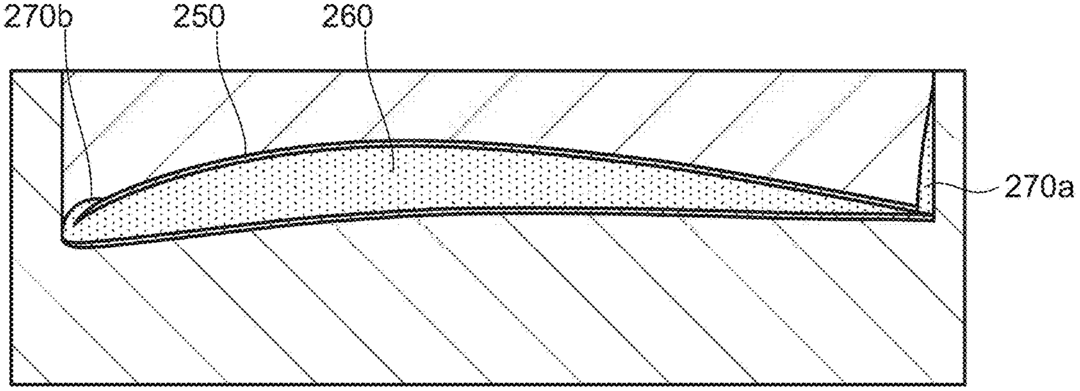

On the other hand, when much of the surplus of foam 260_a_ is removed through the front end of blade trailing edge 240 as in the embodiment illustrated in FIGS. 4A and 4B, the surplus of foam 260_a_ discharged from the front end of main body portion 230 flows along the surface of sheet 250_a_ of main body portion 230 during hot-pressing. As a result, hardened burr 270_b_ is formed on the surface of skin material 250 (FIGS. 4A and 4B). It is easier to remove needle-shaped burr 270_a_ as illustrated in FIGS. 3A and 3B than to remove burr 270_b_ hardened on the surface of skin material 250 (when foam 260_a_ and sheet 250_a_ contain the same type of thermoplastic resin, foam 260_a_ and sheet 250_a_ are more likely to be fused together, and thus, removing needle-shaped burr 270_a_ is easier). Therefore, the embodiment illustrated in FIGS. 3A and 3B is preferable from the viewpoint of reducing manufacturing costs associated with removing burr 270_b_. However, blade 200 produced in the embodiment illustrated in FIGS. 3A and 3B and blade 200 produced in the embodiment illustrated in FIGS. 4A and 4B have substantially the same specific stiffness, and both can be put to practical use.

When blade 200 moves through a fluid such as air, the relative movement of the fluid along the surface of blade 200 significantly impacts the performance of blade 200; therefore, it is necessary to smooth the surface of blade 200 to prevent such an unexpected relative movement of the fluid. For example, when the surface of blade 200 is highly rough and turbulence occurs near the surface of blade 200, the flight of a drone or the like equipped with blade 200 may become unstable. The method of the present embodiment can easily smooth the surface of blade 200, thereby also reducing the manufacturing cost of the blade.

The temperature during hot-pressing is preferably a temperature that is −20° C. or more and +50° C. or less, more preferably −10° C. or more and +30° C. or less, and even more preferably 0° C. or more and +20° C. or less, with respect to the melting point of the thermoplastic resin contained in foam 260_a_ and the fiber-reinforced thermoplastic resin (when the foam and the fiber-reinforced thermoplastic resin include different types of thermoplastic resins, the melting point of the thermoplastic resin with the highest melting point).

The pressure during hot-pressing is preferably 0.2 MPa or more and 10 MPa or less, more preferably 0.3 MPa or more and 7 MPa or less, and even more preferably 0.5 MPa or more and 5 MPa or less.

The holding time at a set temperature during hot-pressing is preferably 1 second or more and 10 minutes or less, more preferably 5 seconds or more and 5 minutes or less, and even more preferably 10 seconds or more and 1 minute or less.

After hot-pressing, it is preferable to rapidly cool the mold. Rapid cooling can prevent the foam from melting while satisfactory adhesion to the skin material can be obtained. For example, the cooling rate is preferably 0.1° C./min or more and 100° C./min or less, more preferably 1° C./min or more and 50° C./min or less, and even more preferably 5° C./min or more and 30° C./min.

Post-processing, such as drilling a hole for inserting a rotating shaft can be performed on blade 200 taken out from the mold, as necessary.

Figure 5A:
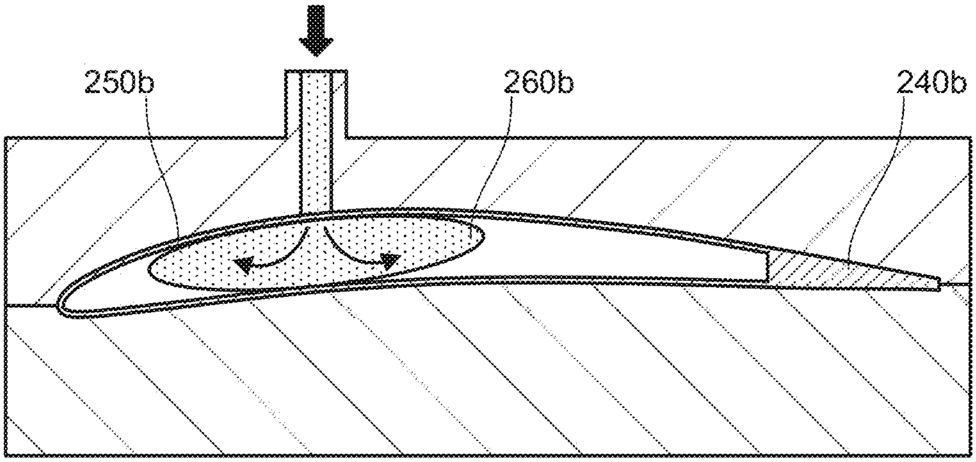
FIGS. 5A and 5B are schematic cross-sectional views illustrating how a blade is produced with a thermosetting resin.
Figure 5B:
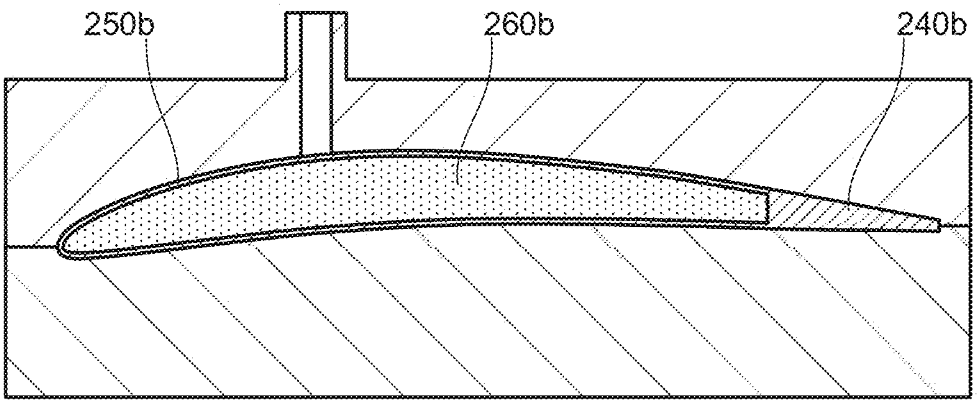

For forming a core material by using a thermosetting resin, thermosetting resin 260_b_ before curing (namely, the material of the core material), should be allowed to flow and to be introduced into skin material 250_b_ disposed inside a mold (FIG. 5A). However, this method has a disadvantage such that the viscosity of thermosetting resin 260_b_ before the curing is low, and the change in the charged weight becomes too large. This method also has another disadvantage as follows: sealing is required in the foaming step, and thus it is necessary to bond the thin blade trailing edge 240 with skin materials 250, which makes impossible to form a blade trailing edge including a core material made of resin foam held between the skin materials, and only blade trailing edge 240_b_ consisting of only the upper and lower skin materials 250 can be formed (FIG. 5B). For forming a blade trailing edge including a skin material made of a fiber-reinforced resin and a core material containing a foam that fills inside the skin material, both the fiber reinforced resin and the foam need to contain a thermoplastic resin.

OTHER EMBODIMENTS

It should be noted that the above-described embodiment merely indicates an example of the present invention, and the present invention is not limited to the above-described embodiment, and various other embodiments are possible within the scope of the idea of the present invention.

For example, in the above embodiment, the description is made with a blade as a rotating blade for a drone as an example, but the type of blade is not limited thereto. Examples of blades to which the present invention can be applied include various types of blades moving inside a fluid (gas or liquid) to generate a predetermined force, such as propellers of airplanes, flying cars, and ships, rotating blades of helicopters, wings such as main wings and tails of airplanes, and rotating blades of windmills and the like. In particular, the present invention can form a thinner blade trailing edge which has excellent specific stiffness, thus can be preferably applied as a rotating blade for a flying object such as a drone, helicopter, or flying car.

Another embodiment of the present invention provides a flying object including a blade according to the embodiments described above. In such a flying object, the blade trailing edge can be made thinner and has excellent specific stiffness, so that the possible takeoff weight can be increased. Further, in a flying object, the blade is preferably a rotating blade. A flying object may be manned or unmanned.

EXAMPLES

The present invention will be described in detail based on Examples, but the present invention is not limited to these Examples.

1. Production of Blade 1-1. Production of Blade 1

As a material for a skin material, a unidirectional carbon fiber-reinforced resin sheet (product name: TAFNEX, fiber volume fraction (Vf): 50%, thickness: 0.16 mm, manufactured by Mitsui Chemicals, Inc.) was prepared. The unidirectional carbon fiber-reinforced resin sheet is obtained by impregnating long fibers of carbon fibers oriented in one direction (herein also referred to as "unidirectional carbon fibers") with a polypropylene matrix resin. This unidirectional carbon fiber-reinforced resin sheet was punched by using a Thomson blade to obtain a fiber-reinforced thermoplastic resin sheet for the skin material having a shape illustrated in FIG. 2A. The punched shape had a length of 700 mm in the major axis direction (horizontal direction in FIG. 2A), a maximum width of 60 mm in the minor axis direction (vertical direction in FIG. 2A), and a surface area of 250 $cm^2$. The following two types of sheets were obtained: a sheet obtained by punching in such a way that unidirectional carbon fibers are oriented in the major axis direction (hereinafter referred to as "sheet (horizontal)"), and a sheet obtained by punching in such a way that unidirectional carbon fibers are oriented in the minor axis direction (hereinafter referred to as "sheet (vertical)").

As a material for a core material, a polypropylene foam sheet (product name PAULOWNIA, density: 0.3 g/cc, expansion ratio: 3 times, thickness: 5 mm, manufactured by Mitsui Chemicals Tohcello, Inc.) was prepared. This polypropylene foam sheet was punched by using a Thomson blade to obtain a thermoplastic resin foam for the core material. The punched shape had a width shorter by 7.6 mm at the part to become a blade trailing edge than that of the shape illustrated in FIG. 2A. The surface area was 210 $cm^2$.

Two sheet sets were prepared. In each set, three sheets for the skin material are stacked in the order of sheet (horizontal)—sheet (vertical)—sheet (horizontal). The thermoplastic resin foam for the core material was then held between these two sheet sets from the top and bottom of the thermoplastic resin foam, and disposed inside a mold. Then, hot-press molding was performed using a 50 ton press machine under the conditions of a mold temperature of 175° C., a mold clamping force of 10 tons, and a mold clamping time of 1 minute, and then the mold was rapidly cooled to 50° C. to obtain blade 1.

1-2. Production of Blade 2

As a fiber-reinforced thermoplastic resin sheet for the skin material, a sheet (horizontal) having a shape in which the width of main body portion 230 was extended forward by 2 mm compared to the shape illustrated in FIG. 2A was obtained (hereinafter referred to as "sheet (horizontal/long)").

Two sheet sets were prepared. In each set, three sheets for the skin material were stacked in the order of sheet (horizontal/long)-sheet (vertical)-sheet (horizontal). The thermoplastic resin foam for the core material was then held between these two sheet sets from the top and bottom of the thermoplastic resin foam, and disposed inside a mold. At that time, the sheet (horizontal/long) was disposed on the outermost side of each of the upper and lower sheet sets, and the front end of the sheet (horizontal/long) was wrapped around the front corner of the thermoplastic resin foam for the core material. The front ends of the two upper and lower sheets (horizontal/long), which were wrapped around, were not in contact to each other when disposed in the mold. Thereafter, hot-press molding and rapid cooling were performed in the same manner as blade 1 to obtain blade 2.

1-3. Production of Blade 3

The unidirectional carbon fiber-reinforced resin sheet (product name: TAFNEX, fiber volume fraction (Vf): 50%, thickness: 0.16 mm, manufactured by Mitsui Chemicals, Inc.) was cut into elongated tapes having a width of 12.5 mm. (The unidirectional carbon fiber-reinforced resin sheet is obtained by impregnating long fibers of unidirectional carbon fibers with a polypropylene matrix resin.) The tapes were woven into a fabric to have an aperture ratio of 0.38% and the distance between the warp and weft of about 0.05 mm to about 1 mm on average. This fabric was punched by using a Thomson blade to obtain a sheet having a shape of the sheet (horizontal) (hereinafter referred to as "sheet (woven)") and a sheet having a shape of the sheet (horizontal/long) (hereinafter referred to as "sheet (woven/long)").

Two sheet sets were prepared. In each set, one sheet (woven) and one sheet (woven/long) were stacked. The thermoplastic resin foam for the core material was then held between these two sheet sets from the top and bottom of the thermoplastic resin foam, and disposed inside a mold. At that time, the sheet (woven/long) was disposed on the outermost side of each of the upper and lower sheet sets, and the front end of the sheet (woven/long) was wrapped around the front corner of the thermoplastic resin foam for the core material. The front ends of the two upper and lower sheets (woven/long), which were wrapped around, were not in contact to each other when disposed in the mold. Thereafter, hot-press molding and rapid cooling were performed in the same manner as blade 1 to obtain blade 3.

1-4. Production of Blade 4

The unidirectional carbon fiber-reinforced resin sheet (product name: TAFNEX, fiber volume fraction (Vf): 50%, thickness: 0.16 mm, manufactured by Mitsui Chemicals, Inc.) was punched by using a Thomson blade to obtain a sheet having a shape of the blade trailing edge or the main body portion in the shape of blade illustrated in FIG. 2A. (The unidirectional carbon fiber-reinforced resin sheet is obtained by impregnating long fibers of unidirectional carbon fibers with a polypropylene matrix resin.) At that time, the following two types of sheets were obtained for each of the blade trailing edge and the main body portion: sheets obtained by punching in such a way that unidirectional carbon fibers are oriented in the major axis direction (hereinafter referred to as "sheet (horizontal/blade trailing edge)" and "sheet (horizontal/main body)"), and sheets obtained by punching in such a way that unidirectional carbon fibers are oriented in the minor axis direction (hereinafter referred to as "sheet (vertical/blade trailing edge)" and "sheet (vertical/main body)").

For the blade trailing edge, a nine-layer sheet laminate composed of seven sheets (vertical/blade trailing edge) held between two upper and lower sheets (horizontal/blade trailing edge) was prepared. For main body portion, 9 sheet sets (in each set, 3 sheets were stacked in the order of sheet (horizontal/main body)-sheet (vertical/main body)-sheet (horizontal/main body)) are stacked to prepare a sheet laminate consisting of 27 layers in total. The laminates were disposed inside a mold, and hot-press molding and rapid cooling were performed in the same manner as blade 1 to obtain blade 4.

2. Evaluation 2-1. Specific Stiffness of Blade Trailing Edge

In order to eliminate variations in measured values due to measurement positions, the specific stiffness at the blade trailing edge of each blade was calculated by the following thickness measurements and calculations.

Thickness Measurement

As a resin for embedding resin, a base resin (epofix resin, mixture of 60-90 mass % of 2,2-bis(4-glycidyloxyphenyl) propane and 40-10 mass % of aliphatic (C12-14)glycidyl ether, manufactured by Struers) and a hardener (epofix hardener, 100 mass % triethylenetetramine, manufactured by Struers) were mixed at a weight ratio of the base resin to the hardener of 25:3. Each blade and the above-described mixed resin were put into an embedding container with a diameter of 40 mm, and cured at room temperature for 12 hours to obtain a resin-embedded blade.

Each resin-embedded blade was cut to expose its cross section, and the exposed cross section was roughly polished by using TEGRAMIN-20 polisher (manufactured by Struers) as the polishing plates are changed in the order of #500, #1000, and #2000. The polishing condition was a load of 10 N for 2 minutes, and each time, the cross section was washed with sufficient water to remove polishing debris. Thereafter, for final polishing, the polishing plate/diamond suspension was changed to MD Largo/Diapro Allegro/Largo 9, and after polishing for 3 minutes at a load of 10 N, the polishing plate/diamond suspension was changed to MD-Dac/Diapro NAP R1, and polishing was performed for 10 minutes at a load of 10 N.

The cross section of the blade was observed at a magnification of 20 times by using a microscope VHX-6000 (manufactured by KEYENCE). The average thickness of the upper and lower skin materials and the thickness of the core material were measured at a position that is 2 mm from the rear end of the blade trailing edge and in a part where the width of the blade is maximum.

For test material 1 obtained by stacking the above unidirectional carbon fiber-reinforced resin sheets so as to have the same configuration as the skin material of the blade trailing edge and subjecting the sheets to the hot-press molding under the same conditions as blade 1, and test material 2, which is the above polypropylene foam sheet, the flexural modulus was measured by performing a bending test in accordance with ISO178 (2010). The flexural modulus of test material 1 (skin material) was 60,000 MPa, and the flexural modulus of test material 2 (core material) was 300 MPa.

The bending stiffness D of the blade trailing edge was calculated by using the following formula, based on these measured values. The weight was calculated from the shape of the blade trailing edge and the density of each material. In addition, the specific stiffness was calculated by dividing the stiffness D by the weight of the blade trailing edge. Table 1 shows the results.

$$D = 2D_s + D_0 + D_c \quad \text{Equation 1}$$

$$D_s = E_s\left(\frac{t_s^3}{12}\right) \quad \text{Equation 2}$$

$$D_0 = E_s\left(\frac{t_s(t_c + t_s)^2}{2}\right) \quad \text{Equation 3}$$

$$D_c = E_c\left(\frac{t_c^3}{12}\right) \quad \text{Equation 4}$$

In the above equations, $D_s$ represents the bending stiffness of the skin material, $D_0$ represents the bending stiffness of the axial force generated in the skin material, and $D_c$ represents the bending stiffness of the core material. $E_s$ is the flexural modulus of the skin material (60,000 Mpa), $E_c$ is the flexural modulus of the core material (300 Mpa), $t_s$ is the thickness of the skin material, and $t_c$ is the thickness of the core material. As blade 4 does not include a core material, $D_c$ thereof is 0.

Table 1 shows the results. The numerical values in Table 1 are values obtained by approximating the shape of the blade trailing edge so that the length in the major axis direction is 100 mm, the maximum width in the minor axis direction is 2 mm, and the thickness is 0.6 mm.

2-2. Burr on Front End

The front end of each blade was visually observed to determine whether or not a burr was attached to the surface of the skin material. Table 1 shows the results.

TABLE 1

| | | | Example 1 | Example 2 | Example 3 | Comparative Example 1 |
|---|---|---|---|---|---|---|
| Layer structure | Skin material | Configuration | Unidirectional long fibers/ Laminate | Unidirectional long fibers/ Laminate | Unidirectional long fibers/ Fabric | Unidirectional long fibers/ Laminate |
| | | Front end being wrapped around | No | Yes | Yes | No |
| | Core material | | Yes | Yes | Yes | No |

TABLE 1-continued

| | | | Example 1 | Example 2 | Example 3 | Comparative Example 1 |
|---|---|---|---|---|---|---|
| Result | Thickness [cm] | Skin material | 0.014 | 0.015 | 0.02 | 0.06 |
| | | Core material | 0.032 | 0.03 | 0.02 | — |
| | Weight of blade trailing edge [g] | | 0.094 | 0.098 | 0.117 | 0.156 |
| | Bending stiffness [MPa · $cm^4$] | | 0.917 | 0.946 | 1.040 | 1.080 |
| | Specific stiffness | | 9.76 | 9.65 | 8.89 | 6.92 |
| | Burr on front end | | Yes | No | No | No |

Table 1 shows that the specific stiffness of a blade trailing edge is increased by using a configuration such that the blade trailing edge includes a skin material containing a fiber-reinforced thermoplastic resin, and a core material containing a thermoplastic resin foam filling the inside of the skin material.

This application is entitled to and claims the benefit of Japanese Patent Application No. 2021-185621 filed on Nov. 15, 2021, the disclosure of which including the specification, drawings and abstract is incorporated herein by reference in its entirety.

INDUSTRIAL APPLICABILITY

The blades according to the present invention has high specific stiffness in the blade trailing edge thereof. Therefore, the present invention is expected to further enhance the durability of blades in various applications, promote the use and further development of blades, and contribute to the development of various fields in which blades are used.

REFERENCE SIGNS LIST

100 Drone
110 Body portion
120 Leg portion
200 Blade
210 Center portion
220 Wing portion
230 Main body portion
240 Blade trailing edge
**240*b*** Blade trailing edge
250 Skin material
**250*a*** Fiber-reinforced thermoplastic resin sheet
**252*a*** Front end
**250*b*** Skin material
260 Core material
**260*a*** Thermoplastic resin foam
**260*b*** Thermosetting resin before curing

The invention claimed is:

1. A blade, comprising:

a main body portion; and a blade trailing edge that is thinner than the main body portion and integrally formed with a rear end of the main body portion, wherein the blade trailing edge includes a skin material and a core material, the skin material containing a polypropylene that is fiber-reinforced, the core material containing a foam of a polypropylene filling an inside of the skin material, the skin material comprises an upper skin material and a lower skin material, wherein the core material is held by the upper skin material and the lower skin material, and front ends of the upper skin material and the lower skin material are wrapped around a front corner of the core material.

2. The blade according to claim 1, wherein the blade trailing edge has a thickness of 0.3 mm or more and 10.0 mm or less.

3. The blade according to claim 1, wherein a difference between a melting point of the thermoplastic resin contained in the skin material and a melting point of the polypropylene constituting the foam in the core material is within 10° C.

4. A flying object comprising the blade according claim 1.

5. A method for producing a blade, the blade including a main body portion and a blade trailing edge that is thinner than the main body portion and integrally formed with a rear end of the main body portion, the method comprising:

preparing a polypropylene foam and a fiber-reinforced polypropylene configured to hold the polypropylene foam from a top and a bottom of the polypropylene foam;

wherein in the preparing, the prepared fiber-reinforced polypropylene has a shape such that the fiber-reinforced polypropylene extends and becomes larger at a front of the main body portion; and forming the blade including the blade trailing edge by hot-pressing the polypropylene foam and the fiber-reinforced polypropylene, wherein the blade trailing edge of the formed blade includes a skin material and a core material, the skin material containing the fiber-reinforced polypropylene, the core material containing the polypropylene foam filling an inside of the skin material, wherein in the forming, the hot-pressing is performed after a front of the extending fiber-reinforced polypropylene is wrapped around a front corner of the polypropylene foam and wherein in the forming, a surplus of the polypropylene foam is discharged through a rear end of the blade trailing edge, the polypropylene foam being caused to flow by the hot-pressing.

6. The blade according to claim 1, wherein rear ends of the upper skin material and the lower skin material are not wrapped around the rear corner of the core material.

7. The method according to claim 5, wherein, in the preparing, the prepared polypropylene foam has a decreased width in a front-rear direction of the blade trailing edge.

* * * * *